US005926254A

United States Patent [19]

Nakaoka

[11] Patent Number: 5,926,254

[45] Date of Patent: Jul. 20, 1999

[54] PHOTOGRAPHIC PRINTER

[75] Inventor: Nobuaki Nakaoka, Wakayama, Japan

[73] Assignee: Noritsu Koki, Co., Ltd, Wakayama-ken, Japan

[21] Appl. No.: 08/597,431

[22] Filed: Feb. 8, 1996

[30] Foreign Application Priority Data

Feb. 8, 1995 [JP] Japan .................................... 7-020378

[51] Int. Cl.[6] ..................................................... G03B 27/52

[52] U.S. Cl. ................................................ 355/40; 355/41

[58] Field of Search ................................ 355/40, 41, 42, 355/43, 75

[56] References Cited

U.S. PATENT DOCUMENTS

| | | | |
|---|---|---|---|
| 4,530,599 | 7/1985 | Kaizuma et al. | 355/75 O |
| 5,281,993 | 1/1994 | Crochetierre et al. | 355/40 O |
| 5,317,364 | 5/1994 | Fields | 355/40 O |
| 5,357,314 | 10/1994 | Tahara et al. | 355/75 |

FOREIGN PATENT DOCUMENTS

| | | |
|---|---|---|
| 0259262 | of 1988 | European Pat. Off. . |
| 0315102 | of 1989 | European Pat. Off. . |
| 2758979 | of 1979 | Germany . |
| 6242590 | of 1994 | Japan . |
| 7-14295 | of 1995 | Japan . |

*Primary Examiner*—R. L. Moses
*Assistant Examiner*—Shival Virmani
*Attorney, Agent, or Firm*—Fulbright & Jaworski

[57] ABSTRACT

A photographic printer has an exposure station for exposing and printing images of photographic film on printing paper, a cutter for cutting the photographic film, after a printing process, to film pieces of a length having a predetermined number of frames, and cartridges for collecting the film pieces as sorted into separate orders. Each cartridge stores a group of film pieces stacked one upon the other, and transports the group of film pieces to a film outlet.

11 Claims, 9 Drawing Sheets

PHOTOGRAPHIC PRINTER

BACKGROUND OF THE INVENTION

1. Field of the Invention

The present invention relates to a photographic printer having an exposing device for printing images of photographic film on printing paper.

2. Description of the Related Art

In operating a photographic printer as noted above, it is necessary to arrange photographic film after printing processes according to orders from clients. In a conventional practice of arranging processed photographic film according to orders from clients, photographic film in one order is cut to a plurality of film pieces of a length having a predetermined number of frames, and a storing device is used to place these film pieces relating to one order into a series of negative sheets. Thus, the film pieces are arranged by a unit of negative sheet series for each order (see the Japanese patent application laid open under No. 6-242590, for example).

The above conventional practice involves troublesome operations for keeping the negative sheets and replenishing the photographic printer with the negative sheets, and for managing and operating the photographic printer.

SUMMARY OF THE INVENTION

The present invention has been made having regard to the state of the art noted above, and its object is to provide a photographic printer requiring a reduced trouble of management and operation, which is achieved by an improved sorting device for sorting cut film pieces according to each order.

The above object is fulfilled, according to the present invention, by a photographic printer comprising a cutting device for cutting photographic film, after a printing process, to film pieces of a length having a predetermined number of frames, and a film collecting device for collecting the film pieces as sorted into separate orders. The film collecting device includes, for example, cartridges each for collecting the film pieces stacked vertically.

With this construction, photographic film after a printing process is cut to film pieces of a length having a predetermined number of frames. These film pieces are collected as sorted into separate orders. In this way, the film pieces are arranged according to orders without using negative sheets, whereby the photographic printer requires a reduced trouble of management and operation.

Preferably, the photographic printer further comprises a film transport device for transporting a group of film pieces in each order collected by the film collecting device to a film outlet in collected state. The film transport device may include, for example, a plurality of buckets for receiving the film pieces inserted in a longitudinal direction thereof, an endless chain for supporting the buckets connected thereto at fixed intervals, and a motor for intermittently driving the endless chain.

With this construction, the film outlet for dispensing a group of film pieces in each order may be disposed in a position suited for handling and arranging groups of film pieces collected.

Preferably, the photographic printer further comprises a moving device for moving the film pieces cut by the cutting device, in a direction of film width, and the film transport device has a transport starting position staggered from a cutting position of the cutting device in the direction of film width.

With this construction, the film pieces cut by the cutting device are moved in the direction of film width, and then transported to the film outlet in a stacked state. This construction provides an increased freedom for arranging the cutting device and film transport device, thereby facilitating arrangement thereof.

The film transport device may be constructed to transport the film pieces in a plurality of groups arranged on a transport path.

Since the film pieces are successively transported as arranged in a plurality of groups, the film transport device may be utilized more efficiently than where each group of film pieces is transported by a separate transporting step.

Preferably, the photographic printer further comprises a printing paper collecting device for collecting, as sorted into separate orders, the printing paper printed at the exposure station and then developed, and the film transport device is arranged to transport the film pieces toward a position adjacent the printing paper collecting device.

With this construction, a group of film pieces collected by the film collecting device is transported toward a position adjacent a group of printing paper in one order collected in relation to that group of film pieces. This arrangement facilitates an operation to associate the group of film pieces and the group of printing paper relating to the same order.

Other features and advantages of the invention will be apparent from the following description of a preferred embodiment of the invention, as illustrated in the accompanying drawings.

DETAILED DESCRIPTION OF THE PREFERRED EMBODIMENT

Figure 1:
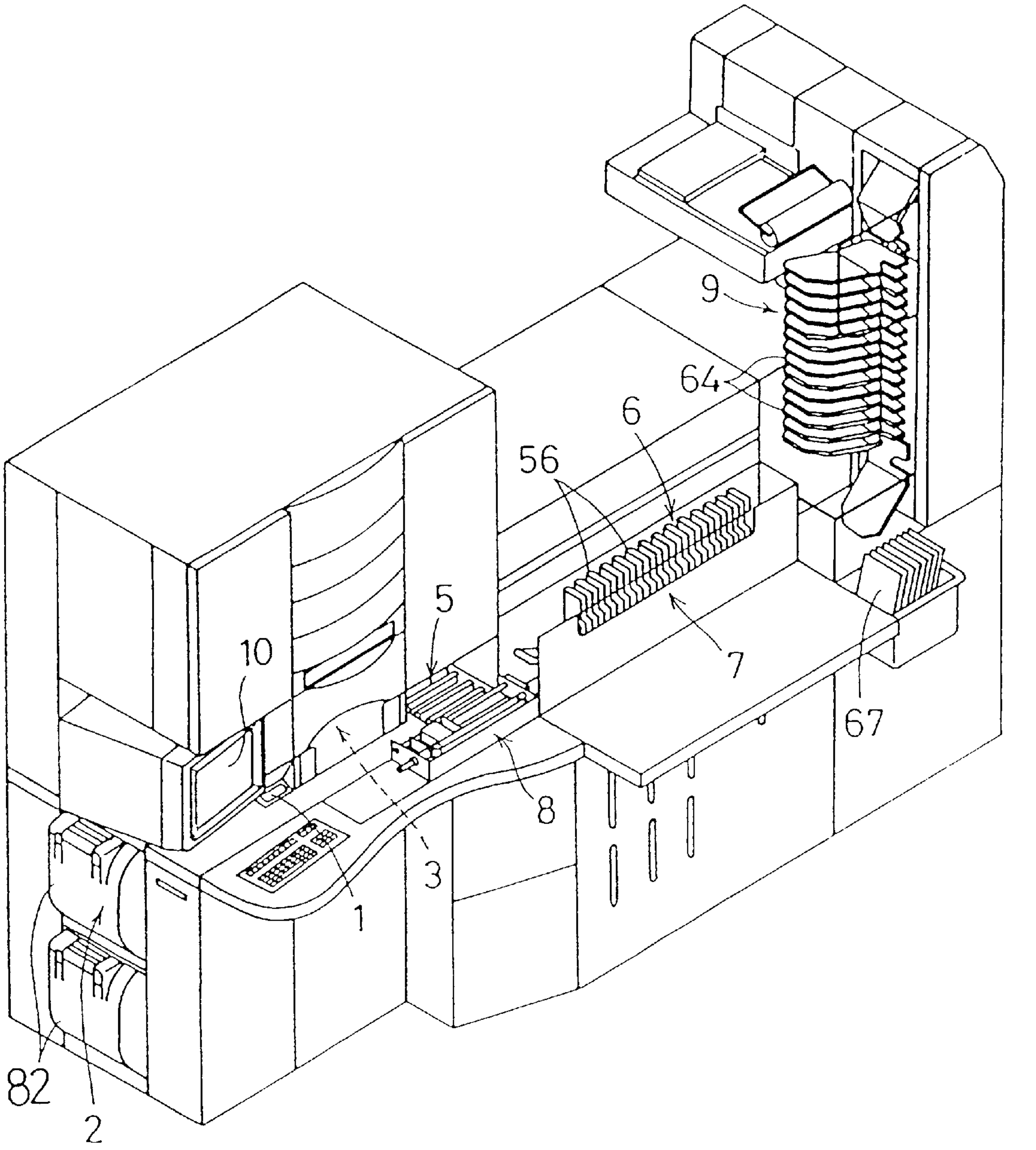
FIG. 1 is a perspective view showing an outward appearance of a photographic printer according to the present invention.
Figure 2:
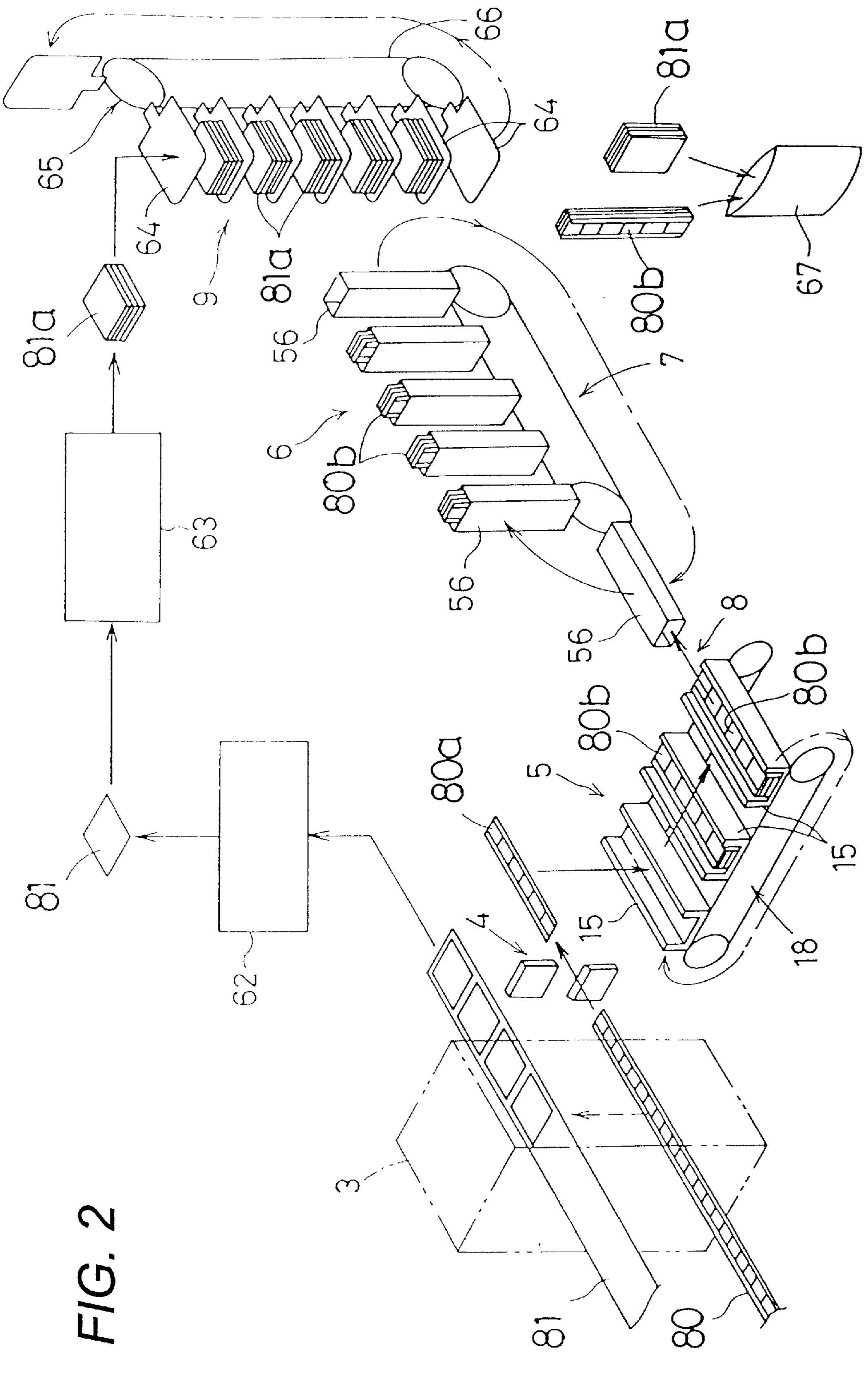
FIG. 2 is a schematic view showing a sequence of processing photographic film and printing paper.

A photographic printer according to the present invention has a construction as shown in FIGS. 1 and 2. A series of developed photographic film 80 corresponding to each order from a client is fed into the photographic printer through a film inlet 1. A roll of printing paper 81 in a magazine 82 is loaded in a printing paper section 2. The printer also includes an exposure station 3 for printing negative images of the film 80 on the printing paper 81. A cutting unit 4 cuts the film 80 after a printing process to film pieces **80*a*** of a length having a predetermined number of frames. A film collecting device

5 collects cut film pieces 80*a* as classified according to orders from clients. A group of film pieces 80*b* collected by the film collecting device 5 is transported in collected state to a film outlet 6 by a film transport device 7. The film group 80*b* collected by the film collecting device 5 is transferred to the film transport device 7 by a film transfer device 8. A printing paper collector 9 collects, as classified according to the orders, the printing paper 81 developed after being printed at the exposure station 3. The above components of the printer are operable under control of a control unit not shown. A cutting position of the cutting device 4 and a transport starting position of the film transport device 7 are staggered in a direction of film width.

At the exposure station 3, the film 80 in each order and the printing paper 81 in strip form are arranged one over the other. The film 80 and printing paper 81 are transported with the surfaces thereof extending horizontally to a printing station not shown, where negative images of the film 80 are successively printed on the printing paper 81. A monitor screen 10 is disposed in a front position of the apparatus for displaying exposure conditions of the negative images.

In this embodiment, a series of developed film 80 in each order is loaded into the apparatus. Alternatively, developed films 80 in a plurality of orders may be connected in series and formed into a roll to be loaded into the apparatus. Then, the films 80 are successively unwound from the roll to be printed on the printing paper 81.

Figure 3:
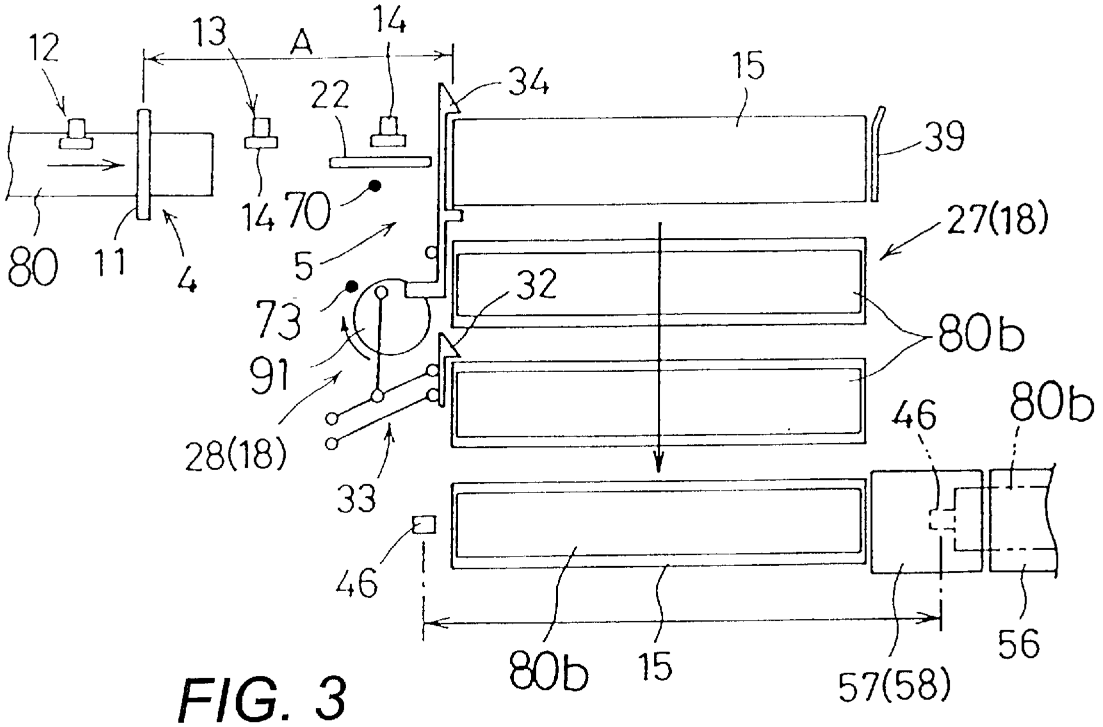
FIG. 3 is a schematic plan view of the photographic printer.
Figure 4:
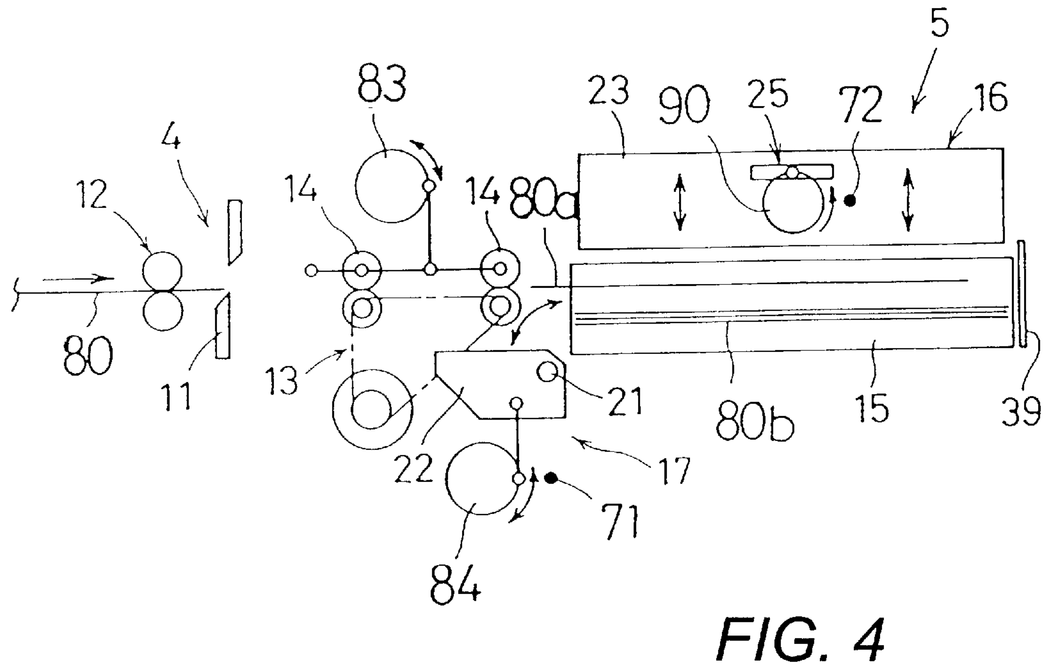
FIG. 4 is a schematic side view of the photographic printer.
Figure 5:
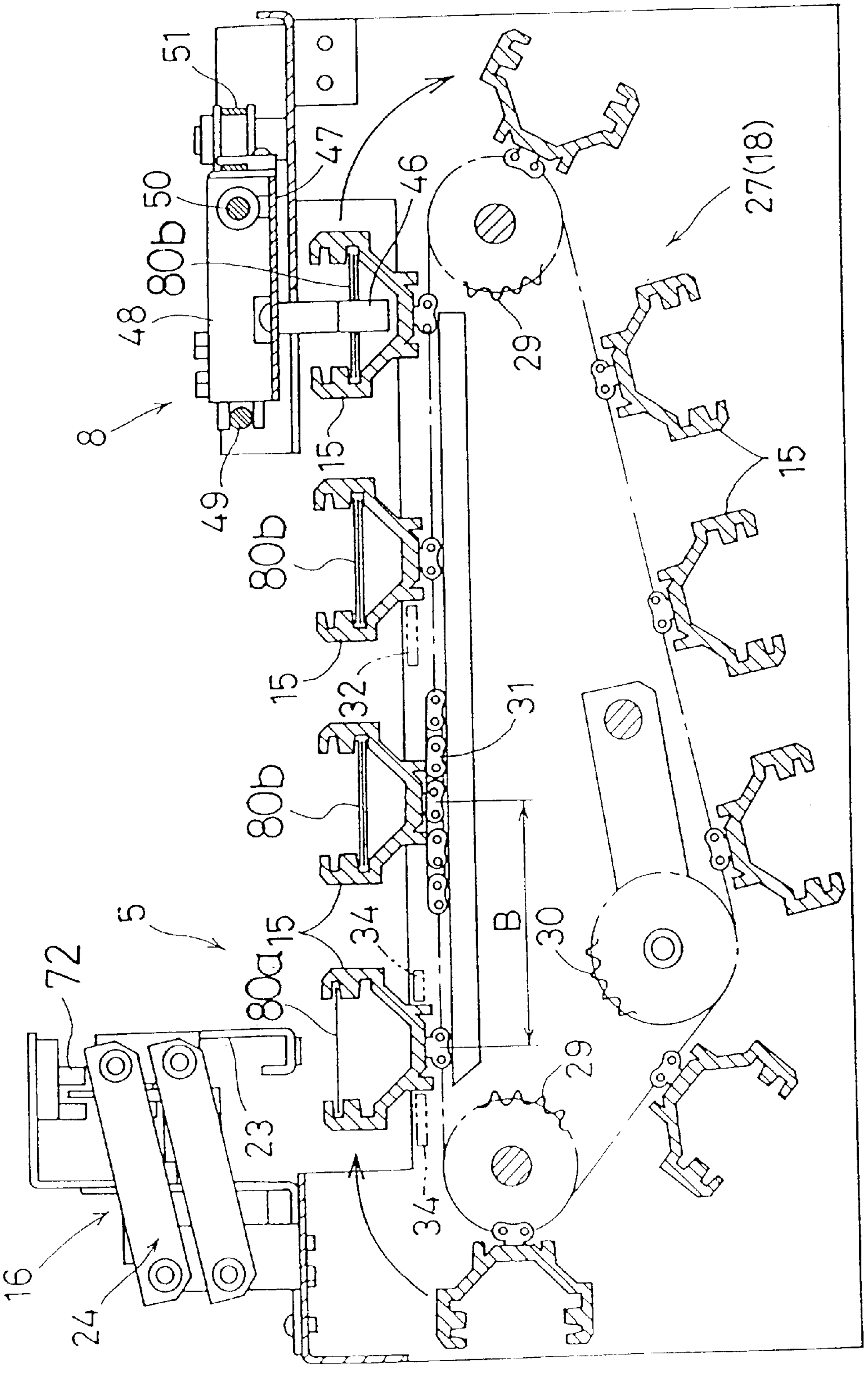
FIG. 5 is a sectional view of the photographic printer.
Figure 6:
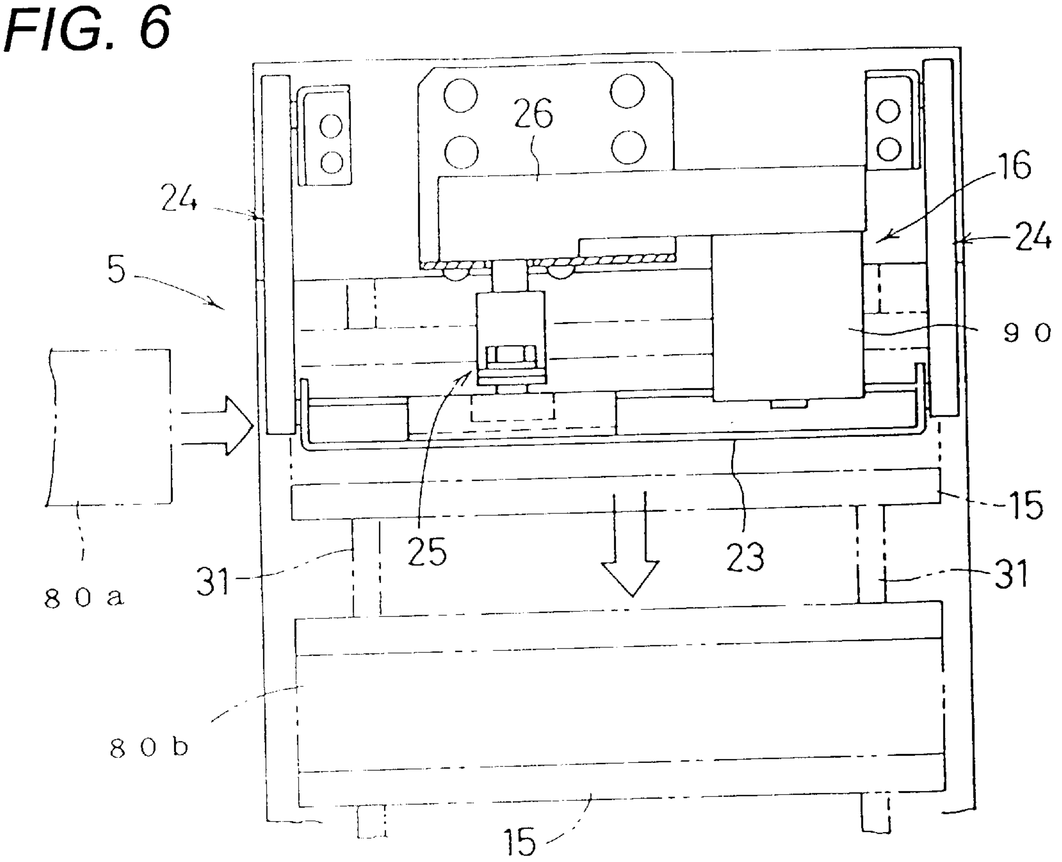
FIG. 6 is a plan view of the photographic printer.

As shown in FIGS. 3 and 4, the cutting device 4 includes a cutter 11 for cutting film 80, two transport units 12 and 13 for elastically clasping from vertical directions and transporting the film 80 after a printing process at the printing station, and a frame counter, not shown, for counting frames in the film 80 transported by the transport units 12 and 13 past the cutting position of the cutter 11. The two transport units 12 and 13 are opposed to each other across the cutting position of the cutter 11. The downstream transport unit 13 includes idle rollers 14 for pressing the film 80 from above. These idle rollers 14 are retractable together to an inoperative position by a first rotary solenoid 83.

Though not shown, a film transport path from the printing station to the cutter 11 includes a speed regulator for adjusting a difference in film processing speed between the printing station and the cutter 11, a film sensor for detecting film 80, and an image detector for detecting negative images recorded on the film 80.

The film 80 in each order is transported by the upstream transport unit 12 after the printing process. A leading portion of the film 80 passes through the cutting position of the cutter 11 to be transported by the downstream transport unit 13. When the count of frames having passed through the cutting position of the cutter 11 reaches a predetermined value, e.g. a multiple of 6, the two transport units 12 and 13 are stopped and the idle rollers 14 of the downstream transport unit 13 are retracted to the inoperative position. Then, the film 80 held in place only by the upstream transport unit 12 is cut along a blank portion between two adjacent frames. In this way, a film piece 80*a* is cut off the film 80.

The number of frames integrated by the frame counter is compared with the number of frames in each order detected by the image detector. The cutting device 4 is operated repeatedly until it is determined that the film 80 in each order has passed through the cutting position of the cutter 11. When the film 80 in each order has passed through the cutting position of the cutter 11, the operation of cutter 11 for that film 80 is stopped and the frame counter is reset.

Where developed films 80 in a plurality of orders are connected in series and formed into a roll to be processed, a joint between films 80 in different orders is detected. The number of frames in the film 80 in each order is counted and compared with the number of frames counted and integrated by the frame counter to control the operation of the cutting device 4.

As shown in FIGS. 4 through 7, the film collecting device 5 includes a stacker 16 for settling the film pieces 80*a* as stacked one upon the other in cartridges 15. The downstream transport unit 13 acts also as a device for feeding the film pieces 80*a* into the cartridges 15. The film collecting device 5 also includes a rear end sensor 70 for detecting rear ends of the film pieces 80*a* transported by the downstream transport unit 13. The downstream transport unit 13 may fail to feed the film pieces 80*a* completely into the cartridges 15. A rear end pusher 17 is provided for forcibly pushing rear ends of such film pieces 80*a* into the cartridges 15. A cartridge moving device 18 moves the film pieces 80*a* loaded in the cartridges 15 in the direction of film width.

Each cartridge 15 has a trough-like shape, with a fixed cross section opening upward, elongated in a direction in which the film pieces 80*a* are fed. The cartridge 15 includes a first pair of upper right and left grooves 19 and a second pair of lower right and left grooves 20. The first grooves 19 receive side edges of each film piece 80*a* fed by the downstream transport unit 13. The second grooves 20 receive side edges of a plurality of film pieces 80*a* stacked. The film pieces 80*a* are inserted through an inlet end of the cartridge 15 where ends of the first grooves 19 are open, and pushed out through an outlet end of the cartridge 15 where ends of the second grooves 20 are open. Each cartridge 15 is placed relative to the cutter 11 such that a distance A between the inlet end of the cartridge 15 and the cutting position of the cutter 11 is shorter than each film piece 80*a*. Thus, as the downstream transport unit 13 transports uncut film 80, the opposite side edges at a leading end of the film 80 enter the first grooves 19.

The rear end pusher 17 is provided separately from the cartridges 15 and secured to an apparatus frame. The pusher 17 includes a pushing element 22 supported to be vertically pivotable about a pivotal axis 21 disposed below the second grooves 20, a second rotary solenoid 84 for vertically swinging the pushing element 22, and a return sensor 71 for detecting the pushing element 22 retracted to a standby position.

The stacker 16 also is provided separately from the cartridges 15 and secured to the apparatus frame. The stacker 16 includes an elongated pressing element 23 for pressing down each film piece 80*a* fitted in the first grooves 19 so that the opposite side edges thereof snap into the second grooves 20, parallel links 24 for vertically movably supporting the pressing element 23, a crank mechanism 25 for vertically reciprocating the pressing element 23, a pressing motor 90 for driving the crank mechanism 25, a reduction device 26 for operating the crank mechanism 25 at a predetermined rate, and a return sensor 72 for detecting the pressing element 23 retracted to a standby position. With each film piece 80*a* transferred from the first grooves 19 to the second grooves 20, a subsequent film piece 80*a* is inserted into the first grooves 19 with ease.

The cartridge moving device 18 moves the film pieces 80*a* stacked in each cartridge 15, along with the cartridge 15, in the direction of film width toward the transport starting position of the film transport device 7. The cartridge moving device 18 includes a cartridge guide 27 for guiding the cartridges 15 along a predetermined loop path, and a cartridge drive 28 for intermittently driving the cartridges 15 supported by the cartridge guide 27 along the loop path.

The cartridge guide 27 has an endless chain 31 wound around sprockets 29 and a tension sprocket 30 supported by the apparatus frame. The cartridges 15 are connected to the endless chain 31 as arranged parallel to one another at predetermined intervals in the direction of film width. The cartridges 15 are movable under guiding action of the endless chain 31 along the loop path between a stacking position of the stacker 16 and the transport starting position of the film transport device 7, The cartridge drive 28 has a feed pawl 32 for engaging one of the cartridges 15 and intermittently moving the endless chain 31 by a distance B between adjacent cartridges 15. A link mechanism 33 driven by a cartridge drive motor 91 advances the feed pawl 32 in predetermined timing. The cartridge 15 arriving at the stacking position of the stacker 16 is engaged and stopped by a lock pawl 34 attached to a swing arm 35 pivotable about a pivotal axis 40. A pawl return sensor 73 is provided for detecting the feed pawl 32 in a standby position between cartridges 15.

The link mechanism 33 includes parallel links 41 having a link element 37, a pivot arm 42 pivotable by the cartridge drive motor 91, and a drive link 43 for swinging the parallel links 41 with a pivotal movement of the pivot arm 42. A press roller 36 is provided at a connection between the pivot arm 42 and the drive link 43 for pressing one end of the swing arm 35 having the lock pawl 34 to move the lock pawl 34 to a release position in predetermined timing.

The feed pawl 32 is pivotable about a pivotal axis 38 supported by the link element 37, between an engaging position between adjacent cartridges 15 to engage one of these cartridges 15, and a release position retracted from the cartridges 15. The feed pawl 32 is biased toward the engaging position.

The swing arm 35 is movable between an engaging position for placing the lock pawl 34 in engagement with an end of one of the cartridges 15, and a release position for canceling this engagement. The swing arm 35 is biased toward the engaging position.

A sequence of operation of the film collecting device 5 will be described next.

The film 80 transported by the downstream transport unit 13 toward the cartridges 15 is cut to film pieces 80*a* by the cutter 11. When a detecting device, not shown, detects the cutter 11 returned to a standby position, the first rotary solenoid 83 is operated to move the idle rollers 14 to a pressing position, and the downstream transport unit 13 is driven to feed each film piece 80*a* along the first grooves 19 into one of the cartridges 15. When the rear end sensor 70 detects the rear end of the film piece 80*a,* the second rotary solenoid 84 is operated to swing the pushing element 22 upward from the standby position. The pushing element 22 is returned to the standby position after forcibly pushing the rear end of the film piece 80*a* into the cartridge 15.

Taking into account a time lag from detection of the rear end of the film piece 80*a* to pushing action of the pushing element 22, the rear end sensor 70 is disposed in a position to detect the rear end of the film piece 80*a* immediately before the rear end passes the final idle roller 14. Thus, the pushing element 22 applies the pushing action to the rear end of the film piece 80*a* after the rear end passes the final idle roller 14.

The film piece 80*a* forcibly pushed into the cartridge 15 by the pushing element 22 could exit the cartridge 15 through the outlet end by inertia. However, the exit is prevented by a stopper 39 erected on the apparatus frame adjacent the outlet end of the cartridge 15.

Figure 7A:
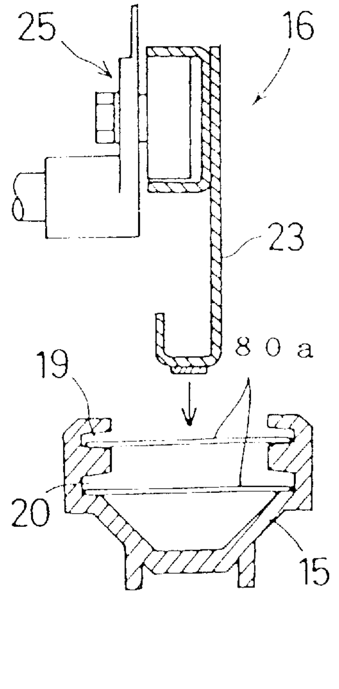
FIG. 7 is an explanatory sectional view showing operation of a collecting device.
Figure 7B:
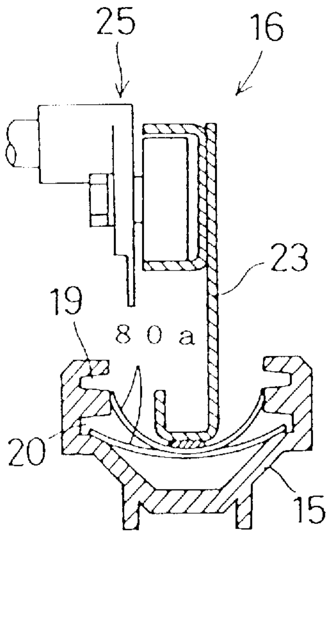
Figure 7C:
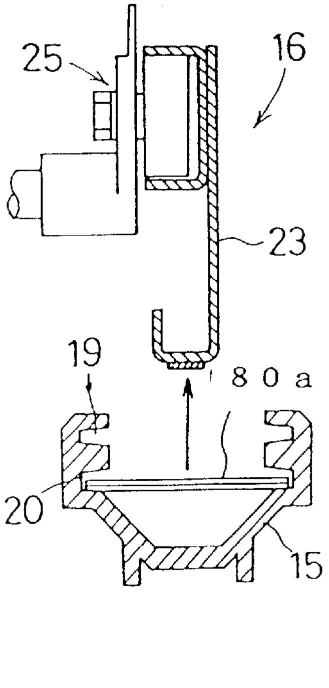

When the return sensor 71 detects the pushing element 22 retracted to the standby position, the pressing motor 90 of the stacker 16 is driven to cause the pressing element 23 to press down substantially a middle position transversely of the film piece 80*a* fitted in the first grooves 19 as shown in FIG. 7(*a*). Then, as shown in FIG. 7(*b*), the film piece 80*a* is curved and pushed toward the second grooves 20. After the opposite side edges are fitted into the second grooves 20, as shown in FIG. 7(*c*), the pressing element 23 is retracted to the standby position. The pressing motor 90 is stopped when the return sensor 72 detects the pressing element 23 returned to the standby position.

Ultimately, the downstream transport unit 13 transport the final film piece 80*a* of the film group 80*b* in one order, i.e. the remainder of film 80 having passed the cutting position of the cutter 11 without being cut. When the stacker 16 places the final film piece 80*a* in the cartridge 15, the cartridge moving device 18 is operated as shown in FIGS. 8(*a*) through (*c*).

Figure 8A:
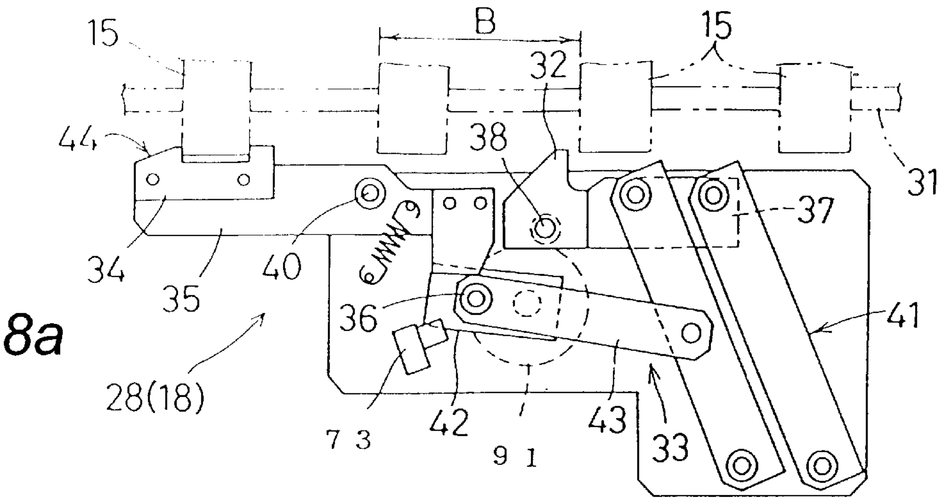
FIG. 8 is an explanatory plan view showing operation of a cartridge moving device.
Figure 8B:
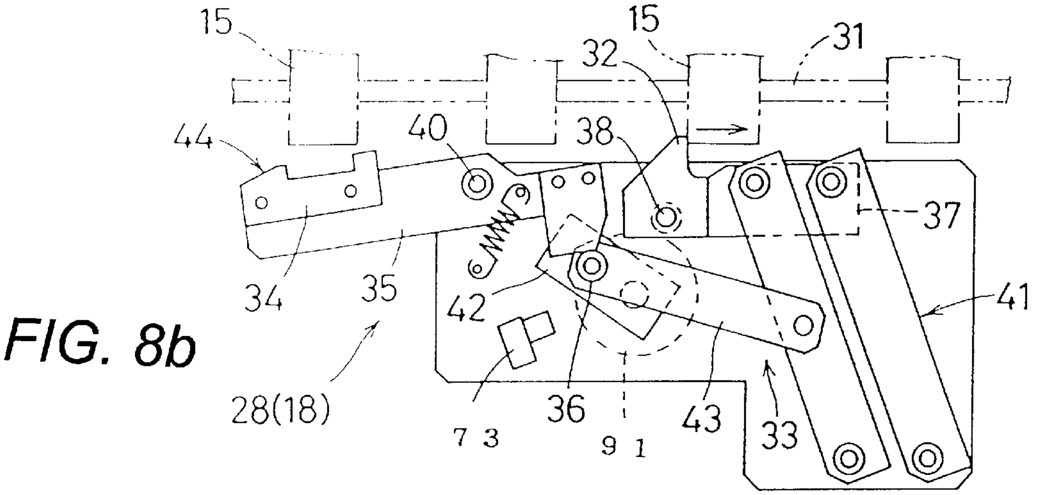
Figure 8C:
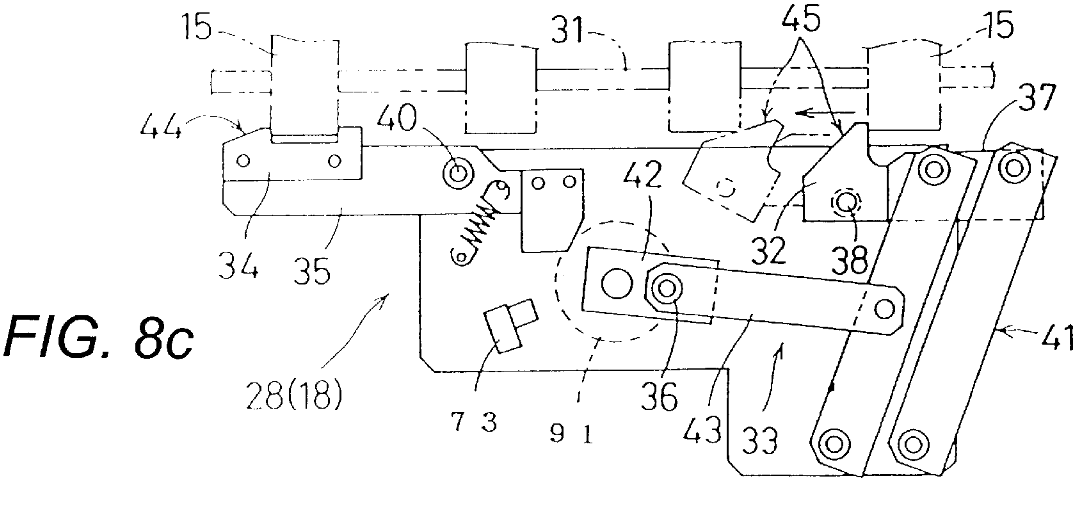

FIG. 8(*a*) shows an initial state prior to operation of the cartridge moving device 18. In this state, the lock pawl 34 engages the cartridge 15 staying in the stacking position of the stacker 16, with the feed pawl 32 retracted to the standby position between adjacent cartridges 15.

When the cartridge drive motor 91 is operated, as shown in FIG. 8(*b*), the press roller 36 swings the swing arm 35 against the biasing force. As a result, the lock pawl 15 engaging the end of the cartridge 15 is moved to the release position, and the feed pawl 32 standing by between cartridges 15 is moved by action of the parallel links 41 to engage and push one of the cartridges 15. By the feeding action of the feed pawl 32, the cartridges 15 connected to the endless chain 31 move together along the loop path.

When the cartridge 15 engaged by the lock pawl 34 moves out of engagement with the lock pawl 34, the lock pawl 34 returns to the engaging position. As the cartridges 15 move further on, a next, empty cartridge 15 upstream with respect to the direction of cartridge movement presses upon a contact surface 44 formed on the lock pawl 34 to move the lock pawl 34 to the release position against the biasing force.

The feed pawl 32 has a moving stroke determined by the action of the link mechanism 33, which corresponds to the distance B between adjacent cartridges 15. When the cartridges 15 have moved by the distance B, as shown in FIG. 8(*c*), the empty cartridge 15 noted above lies in the stacking position of the stacker 16. Then, the lock pawl 34 engages the empty cartridge 15, and the feed pawl 32 is returned.

With the return of the feed pawl 32, a contact surface 45 formed on the feed pawl 32 contacts one of the cartridges 15 upstream with respect to the direction of cartridge movement. By pushing action of this cartridge 15, the feed pawl 32 pivots to the retracted position against the biasing force. Then, the feed pawl 32 overrides the end of the cartridge 15 back to the standby position.

The cartridge drive motor 91 is stopped when the pawl return sensor 73 detects the feed pawl 32 returned to the standby position. Subsequently, the film collecting device 5 is operated again to collect film 80 in the next order.

As described above, when the film group 80*b* in one order is collected in one cartridge 15, the cartridge moving device 18 is operated to move the cartridge 15 from the stacking position of the stacker 16 by the distance B between adjacent cartridges 15. At the same time, the next, empty cartridge 15 upstream with respect to the direction of cartridge movement is moved to the stacking position of the stacker 16. A film group 80*b* in a different order is collected in the empty cartridge 15. Thus, the film pieces 80*a* in each different order are collected in one of the cartridges 15.

The film transfer device 8 and film transport device 7 will be described next.

Figure 9:
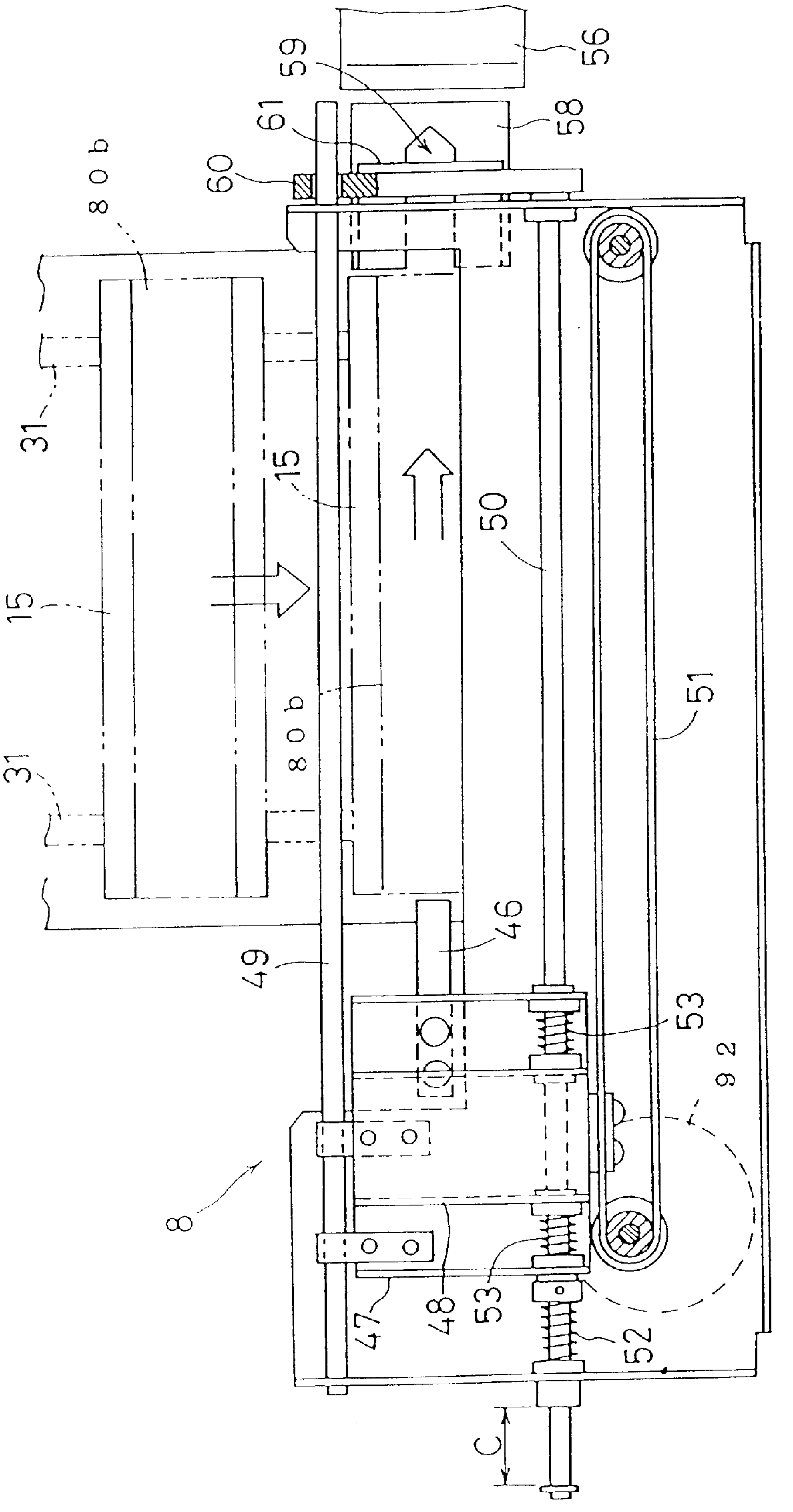
FIG. 9 is a plan view of a film transfer device.
Figures 10A, 10B:
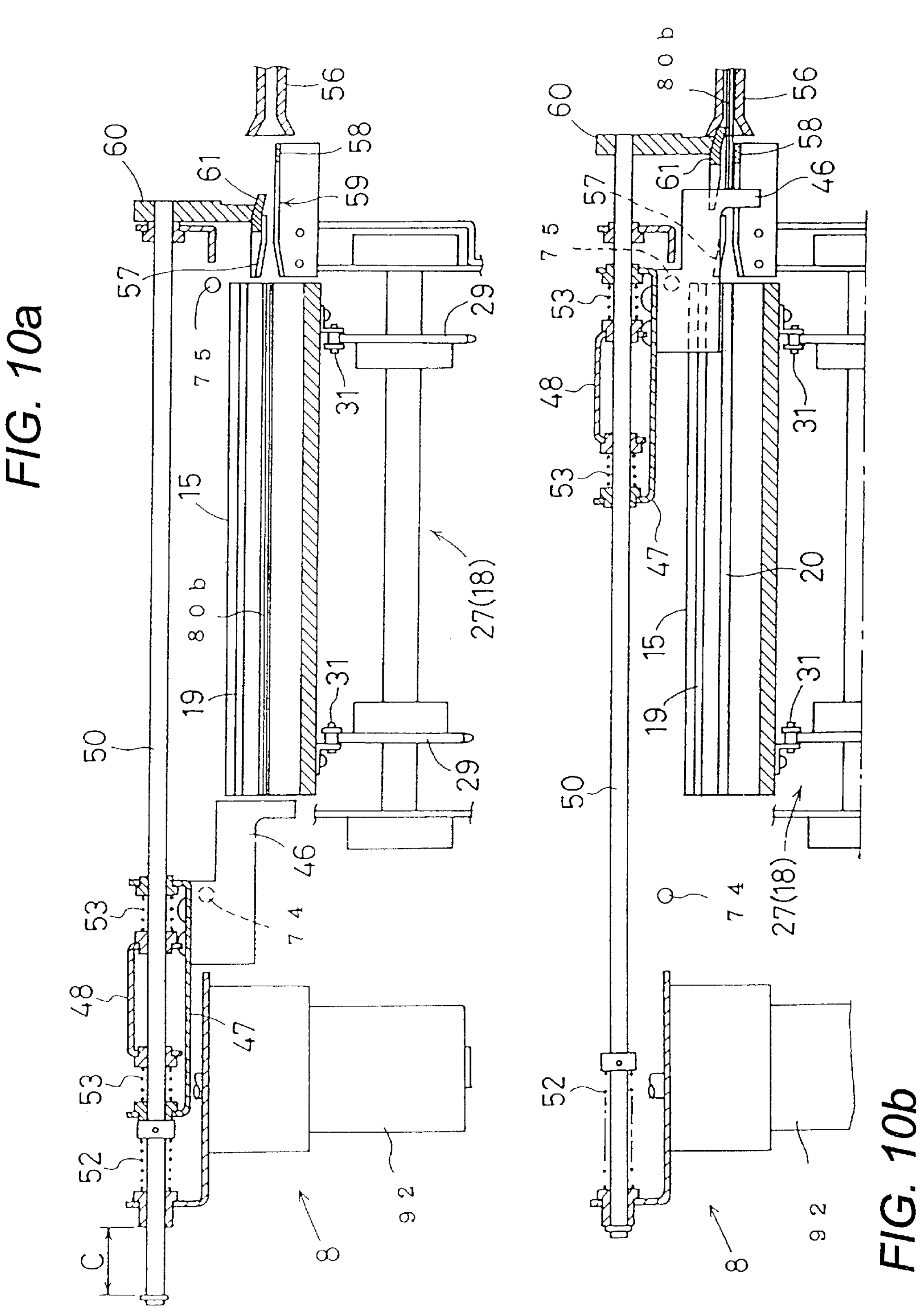
FIG. 10 is an explanatory side view showing operation of the film transfer device.

The cartridge moving device 18 stops when each cartridge 15 reaches a predetermined transfer position. Then, the film transfer device 8 transfers the film group 80*b* in one order from the cartridge 15 to the film transport device 7. As shown in FIGS. 9 and 10, the transfer device 8 includes a pushing plate 46 fixed to a pushing slide plate 47 for pushing the film group 80*b* in the cartridge 15 stopped in the transfer position, along the second grooves 20 toward the transport starting position of the film transport device 7. The transfer device 8 further includes a driving slide plate 48 movable by a transfer drive motor 92. The pushing slide plate 47 and driving slide plate 48 are guided by a pair of right and left guide shafts 49 and 50 to slide back and forth longitudinally of the cartridge 15. A standby sensor 74 is provided for detecting the pushing plate 46 in a standby position, and a push completion sensor 75 for detecting the pushing plate 46 in a push completing position. The transfer drive motor 92 is operable in interlocked relationship with the cartridge moving device 18.

One of the guide shafts 49 is fixed to the apparatus frame, while the other guide shaft 50 is supported by the apparatus frame to be axially movable relative thereto within a stroke range C until a rear end position of the guide shaft 50 contacts the apparatus frame. The driving slide plate 48 is connected to an endless belt 51 movable by the transfer drive motor 92 back and forth axially of the guide shafts 49 and 50.

The pushing slide plate 47 has a channel-shaped construction opening upward, with the movable guide shaft 50 extending through front and rear vertical walls thereof. The driving slide plate 48 is mounted on the movable guide shaft 50 between the vertical walls of the pushing slide plate 47. A compression coil spring 52 is mounted between the rear wall of the pushing slide plate 47 and the apparatus frame.

Compression coil springs 53 are mounted between a front end of the driving slide plate 48 and the front wall of the pushing slide plate 47 and between a rear end of the driving slide plate 48 and the rear wall of the pushing slide plate 47, respectively. Thus, the driving slide plate 48 and pushing slide plate 47 are assembled to be movable together. Even if the driving slide plate 48 and pushing slide plate 47 move relative to each other, the two plates are reinstated in a predetermined relative position.

Figure 11:
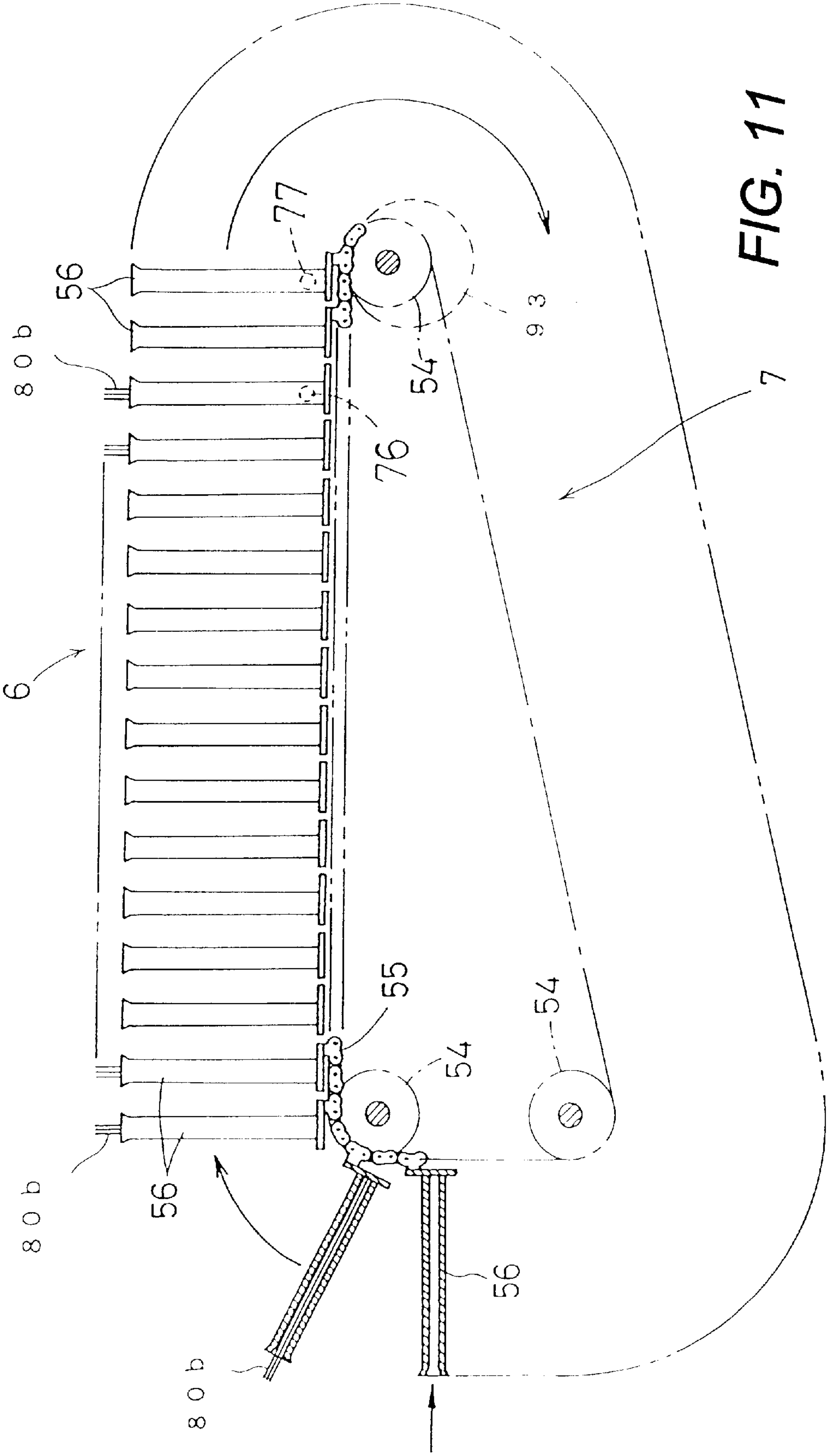
FIG. 11 is a side view of a film transport device.

As shown in FIG. 11, the film transport device 7 includes an endless chain 55 wound around sprockets 54 supported by the apparatus frame, a plurality of buckets 56 connected to the endless chain 55 and arranged at fixed intervals, and a bucket drive motor 93 for intermittently driving the endless chain 55 in predetermined timing. With movement of the endless chain 55, the film transport device 7 transports the film group 80*b* transferred thereto to the film outlet 6 adjacent the printing paper collector 9. The bucket drive motor 93 is operable in interlocked relationship with the cartridge moving device 18.

Each bucket 56 is in the form of a flat tube for receiving a film group 80*b* inserted longitudinally thereof. The buckets 56 are connected to the endless chain 55 in a posture extending perpendicular to a direction of movement of the endless chain 55. In the transfer position opposed to the cartridge 15, each bucket 56 is maintained in a substantially horizontal posture so that its opening is directed to the cartridge 15. After the film group 80*b* is transferred, the bucket 56 is gradually erected to transport the film group 80*b* in upright posture.

Each bucket 56 has a film-receiving depth smaller than the length of the film group 80*b*, so that one end of the film group 80*b* projects upward from the opening of the bucket 56. This construction facilitates withdrawal of the film group 80*b* from the bucket 56.

As shown in FIG. 10, upper and lower flanged guide plates 57 and 58 are fixed to the apparatus frame between the cartridge 15 and the opening of the bucket 56 in horizontal posture in the transfer position. These guide plates 57 and 58 are disposed adjacent the outlet end of the cartridge 15 in the transfer position. This provision allows the film group 80*b* pushed out of the cartridge 15 to enter the bucket 56 smoothly. The upper guide plate 57 is divided into right and left plates arranged at opposite sides of a moving track of the pushing plate 46 and remote from the opening of the bucket 56. The lower guide plate 58 extends to a position close to the opening of the bucket 56. The lower guide plate 58 defines a cutout 59 for allowing entry of the pushing plate 46.

The movable guide shaft 50 has a slide element 60 fixed to a forward end thereof projecting from the apparatus frame. The slide element 60 is slidably guided along the fixed guide shaft 49. A guide plate 61 is fixed to a lower end of the slide element 60 for guiding an upper surface of the film group 80*b* into the bucket 56.

A sequence of operation of the film transfer device 8 and film transport device 7 will be described next.

With operation of the cartridge drive motor 91, the empty cartridge 15 having passed the film group 80*b* on to the film transport device 7 begins to move away from the transfer position. At the same time, the bucket drive motor 93 is operated to move the bucket 56 containing the film group 80*b* transfer thereto. The cartridge drive motor 91 and bucket drive motor 93 are stopped when a cartridge 15 containing a next film group 80*b* to be transferred and an empty bucket 56 reach the transfer position as shown in FIG. 10(*a*).

When the cartridge drive motor 91 and bucket drive motor 93 are stopped, the transfer drive motor 92 is operated to move the pushing slide plate 47 with the driving slide plate 48 toward the bucket 56. With the movement of the driving slide plate 48, the pushing plate 46 pushes the film group 80*b* placed in the cartridge 15 standing still at the transfer position toward the bucket 56. With the movement of the pushing slide plate 47, the rear end thereof has an increasing distance from the apparatus frame. Consequently, the movable guide shaft 50 moves toward the bucket 56, under the biasing force of the compression coil spring 52, until the rear end thereof contacts the apparatus frame. The forward end of the guide plate 61 moving with the movable guide shaft 50 enters the bucket 56.

The pushing plate 46 moves with the guide plate 61 fixed to the forward end of the movable guide shaft 50, until the rear end of the movable guide shaft 50 contacts the apparatus frame. Therefore, the film group 80*b* pushed by the pushing plate 46 enters the bucket 56 after the forward end of the guide plate 61 enters the bucket 56.

When the push completion sensor 75 detects the pushing plate 46 in the push completing position as shown in FIG. 10(*b*), the transfer drive motor 92 is reversed. When the standby sensor 74 detects the pushing plate 46 in the standby position, the transfer drive motor 92 is stopped to complete the operation to transfer the film group 80*b* to the bucket 56.

Thus, a plurality of film groups 80*b* contained in the separate buckets 56 are arranged on a transport path, with a film group 80*b* in an order processed earlier being disposed ahead of the other. Each time the bucket drive motor 93 is operated, these film groups 80*b* are transported little by little toward the film outlet 6.

The printing paper collector 9 includes a cutting device 62 for cutting to frames the printing paper 81 having undergone a printing process at the exposure station 3 and passed through a developing station not shown to be developed and dried, a sorting device 63 for sorting the cut printing paper 81 into printing paper groups 81*a* according to the orders from clients, and a paper transport device 65 for transporting the sorted printing paper groups 81*a* on a plurality of collecting shelves 64. The paper transport device 65 has an endless chain 66 to which the collecting shelves 64 are connected at fixed intervals. Though not shown, a paper transport path from the printing station to the cutting device 62 includes a speed regulator for adjusting a difference in printing paper processing speed between the printing station and the cutting device 62.

After the cut printing paper 81 is sorted as the printing paper group 81*a* in one order, this printing paper group 81*a* is transferred to an empty collecting shelf 64 standing still at the upper end of the transport path of the paper transport device 65. After the transfer of this printing paper group 81*a,* the endless chain 66 is driven to move the collecting shelves 64 together. The endless chain 66 is stopped when a new empty collecting shelf 64 reaches the paper transfer position.

Thus, the collecting shelves 64 carrying the printing paper groups 81*a* are lowered gradually. A printing paper group 81*a* placed on a lower collecting shelf 64 is a printing paper group 81*a* in an order processed earlier than the other. Similarly, as noted herein before, a film group 80*b* disposed ahead of the other in the transport direction of the film transport device 7 is a film group 80*b* in an order processed earlier. Therefore, the film group 80*b* foremost in the transport direction of the film transport device 7 corresponds to the printing paper group 81*a,* foremost in the transport direction of the paper transport device 65. That is, these groups 80*b* and 81*a* belong to the same order. The operator may successively check the film groups 80*b* with the printing paper groups 81*a,* and place these groups in packets order by order.

To avoid the film groups 80*b* and printing paper groups 81*a* being inadvertently left uncollected, a first bucket sensor 76 is provided for detecting any bucket 56 containing a film group 80*b* and having moved close to the terminal end of the transport path. When the first bucket sensor 76 detects a bucket 56 with a film group 80*b* remaining therein, an alarm such as a buzzer is operated to prompt the operator to remove the film group 80*b*.

Further, a second bucket sensor 77 is disposed downstream of the first bucket sensor 76 with respect to the bucket transport direction. When the second bucket sensor 77 detects a bucket 56 with a film group 80*b* remaining therein, the cutting device 4, film collecting device 5 and film transfer device 8 are stopped. Upon lapse of a predetermined time from a bucket detection by the second bucket sensor 77, all operations of the photographic printer including the exposure station 3 are stopped.

The foregoing embodiment may be modified as follows:

1. The film collecting device is not limited to a particular collecting mode. For example, film pieces may be collected in a vertical posture with film planes extending vertically.

2. The film collecting device is not limited to a particular collecting method. For example, film pieces may be collected while being moved in a direction of film width.

3. The film transport device is not limited to a particular transport mode with respect to the posture of film pieces transported. For example, the film pieces may be transported with film planes extending horizontally.

4. The moving device for moving film pieces in the direction of film width may be adapted to move the film pieces cut by the cutting device immediately from the cutting device. In this case, the film pieces may be collected after being moved in the direction of film width or while being moved in the direction of film width.

What is claimed is:

1. A photographic printer having an exposure station for exposing and printing images of photographic film on printing paper, said photographic printer comprising:

cutter means fur cutting said photographic film, after a printing process, to film pieces of a length having a predetermined number of frames; and film collecting means for collecting said film pieces as sorted into separate orders;

said film collecting means including cartridges each for collecting said film pieces stacked vertically; and said film collecting means further including feed means for feeding said film pieces cut by said cutter means into said cartridges, and a sensor for detecting rear ends of said film pieces fed by said feed means.

2. A photographic printer as defined in claim 1, further comprising film transport means for transporting a group of said film pieces in each order collected by said film collecting means to a film outlet in a collected state.

3. A photographic printer as defined in claim 1, wherein said film collecting means includes cartridges each for collecting said film pieces stacked vertically.

4. A photographic printer as defined in claim 1, wherein said film collecting means further includes pushing means for forcibly pushing, into said cartridges, said rear ends of said film pieces failing to be contained in said cartridges by said feed means.

5. A photographic printer having an exposure station for exposing and printing images of photographic film on printing paper, said photographic printer comprising:

cutter means for cutting said photographic film, after a printing process, to film pieces of a length having a predetermined number of frames; and film collecting means for collecting said film pieces as sorted into separate orders;

wherein said film collecting means includes cartridges each for collecting said film pieces stacked vertically; and wherein each of said cartridges integrally defines first grooves and second grooves arranged vertically, said first grooves for receiving said film pieces, said second grooves for receiving said film pieces stacked vertically, said film pieces being inserted into each of said cartridges through an inlet end surface thereof where ends of said first grooves open, a group of said film pieces being pushed out of each of said cartridges through an outlet end surface thereof where ends of said second grooves open.

6. A photographic printer as defined in claim 5, further comprising press means for pressing said film pieces in said first grooves from above to cause said film pieces to enter said second grooves.

7. A photographic printer as defined in claim 1, further comprising moving means for moving said film pieces cut by said cutter means, in a direction of film width, wherein said film transport means has a transport starting position staggered from a cutting position of said cutter means in said direction of film width.

8. A photographic printer having an exposure station for exposing and printing images of photographic film on printing paper, comprising:

cutter means for cutting said photographic film, after a printing process, to film pieces of a length having a predetermined number of frames; and film collecting means for collecting said film pieces as sorted into separate orders;

wherein said film collecting; means includes cartridges each for collecting said films stacked vertically; and said photographic printer further comprises cartridge guide means for guiding said cartridges along a predetermined loop path, and cartridge drive means for driving said cartridges supported by said cartridge guide means along said loop path.

9. A photographic printer as defined in claim 1, wherein said film transport means is constructed to transport said film pieces in a plurality of groups arranged on a transport path.

10. A photographic printer as defined in claim 1, wherein said film transport means includes a plurality of buckets for receiving said film pieces inserted in a longitudinal direction thereof, an endless chain for supporting said buckets connected thereto at fixed intervals, and a motor for intermittently driving said endless chain.

11. A photographic printer as defined in claim 1, further comprising printing paper collecting means for collecting, as sorted into said separate orders, said printing paper printed at said exposure station and then developed, wherein said film transport means is arranged to transport said film pieces toward a position adjacent said printing paper collecting means.

* * * * *